United States Patent
Chen et al.

(10) Patent No.: US 6,741,995 B1
(45) Date of Patent: May 25, 2004

(54) METHOD FOR DYNAMICALLY CREATING A PROFILE

(75) Inventors: Li-Wen Chen, Cupertino, CA (US); Hwa Chung Feng, Cupertino, CA (US)

(73) Assignee: Metaedge Corporation, Santa Clara, CA (US)

( * ) Notice: Subject to any disclaimer, the term of this patent is extended or adjusted under 35 U.S.C. 154(b) by 0 days.

(21) Appl. No.: 09/532,366

(22) Filed: Mar. 21, 2000

Related U.S. Application Data (60) Provisional application No. 60/125,721, filed on Mar. 23, 1999.

(51) Int. Cl.[7] ............................................. G06F 17/00
(52) U.S. Cl. .............................. 707/102; 707/3; 707/5; 707/10; 707/101
(58) Field of Search ............................ 707/5, 10, 101, 707/102, 3, 1; 705/10, 14; 706/11; 345/236; 709/206

(56) References Cited

U.S. PATENT DOCUMENTS

| | | | | |
|---|---|---|---|---|
| 5,870,746 A | | 2/1999 | Knutson et al. ............ 707/101 |
| 6,044,374 A | | 3/2000 | Nesamoney et al. ......... 707/10 |
| 6,064,375 A | | 5/2000 | Velez et al. ................. 345/326 |
| 6,233,570 B1 | * | 5/2001 | Horvitz et al. ............... 706/11 |
| 6,298,328 B1 | * | 10/2001 | Healy et al. ................. 705/10 |
| 6,334,110 B1 | * | 12/2001 | Walter et al. ................ 705/14 |
| 6,405,197 B2 | * | 6/2002 | Gilmour ........................ 707/5 |
| 6,487,584 B1 | * | 11/2002 | Bunney ...................... 709/206 |

OTHER PUBLICATIONS

Smith, M.H., et al., "Fuzzy data mining for querying and retrieval of research archival information" Fuzzy information Processing Society–NAFIPS, 1 conferecne of the North American, Aug. 1998, pp. 140–145, especially p. 140, col. 2, pp. 141–142.

\* cited by examiner

*Primary Examiner*—Thuy N. Pardo (57) ABSTRACT

According to the invention, techniques for profiling of human behavior based upon analyzing data contained in databases, data marts and data warehouses. In an exemplary embodiment, the invention provides for creating a dynamic customer profile by analyzing relationships in data from one or more data sources of an enterprise. The method can be used with many popular visualization tools, such as On Line Analytical Processing (OLAP) tools and the like. The method is especially useful in conjunction with a metamodel based technique for modeling the enterprise data. The enterprise is typically a business activity, but can also be other loci of human activity. The human behavior profiled is typically that of a customer, but can be any other type of human behavior. Embodiments according to the invention can display data from a variety of sources in order to provide visual representations of data in a data warehousing environment.

13 Claims, 10 Drawing Sheets

METHOD FOR DYNAMICALLY CREATING A PROFILE

CROSS-REFERENCES TO RELATED APPLICATIONS

This application claims priority from the following U.S. Provisional Patent Application, the disclosure of which, including all appendices and all attached documents, is incorporated by reference in its entirety for all purposes:

U.S. Provisional Patent Application Serial No. 60/125,721 Li-Wen Chen entitled, "METHOD AND APPARATUS FOR PERFORMING CUSTOMER BEHAVIOR ASSOCIATION ANALYSIS," (Attorney Docket Number 19608-000400US) filed Mar. 23, 1999.

BACKGROUND OF THE INVENTION

The present invention relates generally to computer database systems, and specifically to methods for visualizing information from a data warehousing environment.

Few could foresee the rapid development of computer technology just a few years ago. Computers now have a place in our homes, our offices, our schools and even our briefcases and satchels. As computer automation continues to impact an ever increasing portion of our daily lives, governments, businesses and individuals have turned to database technology to help them manage the "information explosion," the exponential proliferation of information that must be sorted, assimilated and managed on a continuing basis. One area of importance to the database design field is data model selection for database applications.

A data model represents the structure or organization of data stored in the database. It enables the use of data in certain forms and may limit the data being used in other forms. Different applications usually require different data models. Many different data models can exist, and they usually differ markedly from one another. Typically, database applications are customized to a particular data model of a particular database. Usually, these applications must be re-implemented for every database, even though the functioning of the application remains the same.

Presently, database developers have turned to data warehousing technology to resolve often conflicting data management requirements. Traditional data warehousing approaches focus on decision support applications, which emphasize summarized information. While perceived advantages exist, an inherent disadvantage to these systems is that the customer identity is lost. Further, usability of customer data analyses techniques can be improved over traditional approaches by methods for displaying analysis results and database content to the user.

What is needed is a method for analyzing customer data contained in databases, data marts and data warehouses.

SUMMARY OF THE INVENTION

According to the invention, techniques for profiling of human behavior based upon analyzing data contained in databases, data marts and data warehouses are provided. In an exemplary embodiment, the invention provides a method for creating a dynamic customer profile by analyzing relationships in data from one or more data sources of an enterprise. The method can be used with many popular visualization tools, such as On Line Analytical Processing (OLAP) tools and the like. The method is especially useful in conjunction with a meta-model based technique for modeling the enterprise data. The enterprise is typically a business activity, but can also be other loci of human activity. The human behavior profiled is typically that of a customer, but can be any other type of human behavior. Embodiments according to the invention can display data from a variety of sources in order to provide visual representations of data in a data warehousing environment.

A first aspect in accordance with the present invention provides a method for creating a customer profile from customer information. The customer information can be stored in a database, multiple databases, a data mart or a data warehouse, for example. The customer information can comprise one or more attributes. Attributes can include age, gender, income, and the like. The method can include receiving as input the customer information. Receiving can be by means of direct input, or by accessing data in a legacy database, for example. Segmenting the customer information into one or more groups, or segments, based upon a value for the attributes can also be part of the method. The method can also include defining one or more profiles. Profiles can comprise one or more groups. The profiles can be used to analyze the customer information.

In a specific embodiment, the segmenting can include specifying one or more expressions, in which each expression can be evaluated to a particular value. The expression can comprise one or more attributes, where the attributes can be combined based upon one or operators. Operators can include arithmetic operators, logical operators, and the like.

In another specific embodiment, segmenting can include mapping values produced by the one or more expressions to one or more segmentation code values. The method can also include assigning numeric values to particular ones of the segmentation code values. The method can also include assigning enumerative values to particular ones of said plurality of segmentation code values. The method can also include mapping a range of expression values to the one or more segmentation code values.

Numerous benefits are achieved by way of the present invention over conventional techniques. The present invention can provide techniques for profiling human behavior based upon dynamic relationships that can be customized to fit different business needs. Many embodiments enable business applications to be built more easily and quickly than heretofore known methods. These and other benefits are described throughout the present specification. A further understanding of the nature and advantages of the invention herein may be realized by reference to the remaining portions of the specification and the attached drawings.

DESCRIPTION OF THE SPECIFIC EMBODIMENTS

Embodiments according to the present invention can provide techniques for creating and using dynamic profiles of consumer behavior based upon data present in enterprise information processing systems for analysis and the like.

Dynamic profiling techniques according to the present invention enable analysis of customers based upon selected criteria using segmentation techniques. Specific embodiments according to the present invention provide frameworks for users to create and manage customer centric data warehouses having a wide variety of data models such as a star schema data model, a reverse star schema data model and the like. Such data warehouses can avail themselves of analytical functions such as Market Basket Analysis (MBA), Regency/Frequency/Monetary Analysis (RFMA), and the like. In some embodiments, dynamic profiling techniques can include graphical user interfaces (GUI) that enable users to define segmentation schemes for customers and then generate database data based upon the segmentation. This database data can then be incorporated into the data warehouse for use in additional analysis by the user. Some specific embodiments can also include tools that enable profiling of data for use by Online Analytical Processing (OLAP) tools.

In a specific embodiment, usage scenarios, or models, can incorporate dynamic profiling techniques. In a representative example, a bank may want to know how much profit each customer is contributing to the bank's bottom line, and then segment the customers based upon the individual contributions to profitability. Accordingly, this example bank can build a profitability model by calculating the profitability of each individual customer, then defining a customer segmentation, e.g., by percentile, for example, and then defining how the segmented data can be viewed using visualization tools such as OLAP tools, for example. In this representative example, the bank can produce a data warehouse having profiling information that is suitable for viewing using popular visualization tools such as OLAP tools, Excel 2000 and the like.

While embodiments according to the present invention are discussed generally using representative examples, such as the bank, the present invention is readily applicable to a wide variety of business types, industries and business relationships, such as retailing, electronic commerce, telephone-based catalog selling, insurance applications, banking and credit applications, telecommunications and entertainment (e.g. satellite and cable TV service) services, and the like. Thus, the examples used herein are intended to be illustrative and not limiting.

Specific embodiments according to the present invention can include customer profiling techniques such as segmentation assignment and profile composition, for example. Segmentation assignment can comprise partitioning customers into a plurality of groups, or segments, based upon certain attributes, or derived attributes, of the customers. Profile composition can comprise combining one or more groups, or segments, provided by the segmentation assignment into a one or more profiles. For example, a representative database can include an age attribute for each customer.

Table 1 illustrates a particular embodiment in which a segmentation scheme based upon an age attribute is used to segment customers into 3 groups.

TABLE 1

| Age greater than | Age less than | Segment code value |
| --- | --- | --- |
| >10 | <20 | 1 |
| ≧20 | <50 | 2 |
| otherwise | | 3 |

In the representative organization illustrated by Table 1, a segment code value of 1, 2 or 3 can be assigned to a customer based upon the value of the age attribute. For example, customers having an age greater than 10 and less than 20 can be assigned a segment code value of 1. Customers having an age greater than or equal to 20 and less than 50 are assigned a segment code value of 2. All other customers are assigned a segment code value of 3. This effectively segments the customers into three groups based upon the age attribute. Similarly, an income attribute can be used to segment customers in another segment scheme. Other attributes can also be used by specific embodiments according to the present invention without departing from the scope of the claims herein.

In a specific embodiment according to the present invention, segmentation assignment can comprise specifying an expression which evaluates to a specific value. In the example above, the expression is a single quantity; the attribute age. However, in some specific embodiments according to the present invention, expressions can comprise a plurality of customer attributes that can be combined based upon one or more operators including arithmetic operators, logical operators, and the like. Resultants obtained from evaluating expressions can then be used to determine the assignment of customers to segments. Further, embodiments can perform segmentation based upon expressions that aggregate attributes from sources other than customer information such as purchase transaction information and the like. Many other specific embodiments can include a plurality of expressions for segmenting customers based upon any number of combinatorial functions such as Boolean expressions and so forth without departing from the scope of the claims herein.

Specific embodiments can comprise mapping the values produced by various expressions to one or more segmentation code values. This mapping comprises an assignment of numeric values and enumerative values to particular segmentation codes. The representative example discussed above regarding segmentation based upon age defines a range assignment. Range assignments can map ranges of expression values to particular segmentation codes. Specific embodiments can include percentile assignments, which can segment customers based upon an expression value and map the customers by percentile to a particular segment code value. For example, as illustrated in Table 2, the top 20 percent of customers are assigned a segment code value of 1. The next 30 percent of customers are assigned a segment code value of 2. All other customers are assigned a value of 3.

TABLE 2

| Age | Segment code value |
| --- | --- |
| Top 20% | 1 |
| Next 30% | 2 |
| other | 3 |

Expressions can evaluate to non-numeric values, as well. The assignment can specify enumeratively, what expression value maps to a particular segment code value. For example, Table 3 illustrates a particular mapping of enumerative values, in this example; titles, to particular segment code values.

TABLE 3

| Title | Segment code value |
|---|---|
| "CEO" | 1 |
| "Vice President" | 2 |
| "Manager" | 3 |
| Other | 4 |

Table 3 illustrates a representative example wherein a title CEO is mapped to a segment code value of 1. The Vice President is mapped to a segment code value of 2. The manager is mapped to a segment code value of 3 and all others are mapped to a segment code value of 4.

In some specific embodiments, profiles can provide finer segmentation of customers than individual segmentation codes. For example, a profile can be defined based upon an age segmentation and an income segmentation. This example profile can be named "Profile 1", or more meaningfully, "Age Income Profile," for example. This example profile comprises age and income segmentation data and can be denoted using a nomenclature ("A", "I"). Further, in some embodiments different profiles can be created from the same segmentation codes. In another example, suppose R, F, M, P, A and I represent segmentation codes of certain attributes of interest. For example, R=recency, F=frequency, M=monetary, P=profitability, A=age, and I=income. From these segment codes then, a particular profile can be created that comprises (R, F, M). Further, another profile can be created that comprises (R, P, A), and so forth for other subsets of the segmentation codes. Such profiles can provide the capability to reuse defined segmentation assignments in composite arrangements. Table 4 illustrates two profiles that are based upon segmentation codes A, I, R, F, M and P.

TABLE 4

| Profile Name | Composition |
|---|---|
| "profile 1" | R, F, M |
| "Profile 2" | A, P |

Table 4 illustrates a profile 1 comprising segmentation codes R, F and M. Table 4 also illustrates a profile 2 comprising segmentation codes A and P. In this particular representative example, profiles 1 and 2 are created by applying AND predicate to the constituent segment codes. Accordingly, in the example of Table 4, profile 1 specifies customers having segmentation codes (R, F, M)=(1, 1, 1) as belonging to a first segment, while (1, 1, 2) and (1, 1, 3) belong to second and third segments. This "profile" mechanism basically provides a way to group customers into finer segments by combining existing segment codes to create more meaningful categories.

Figure 1:
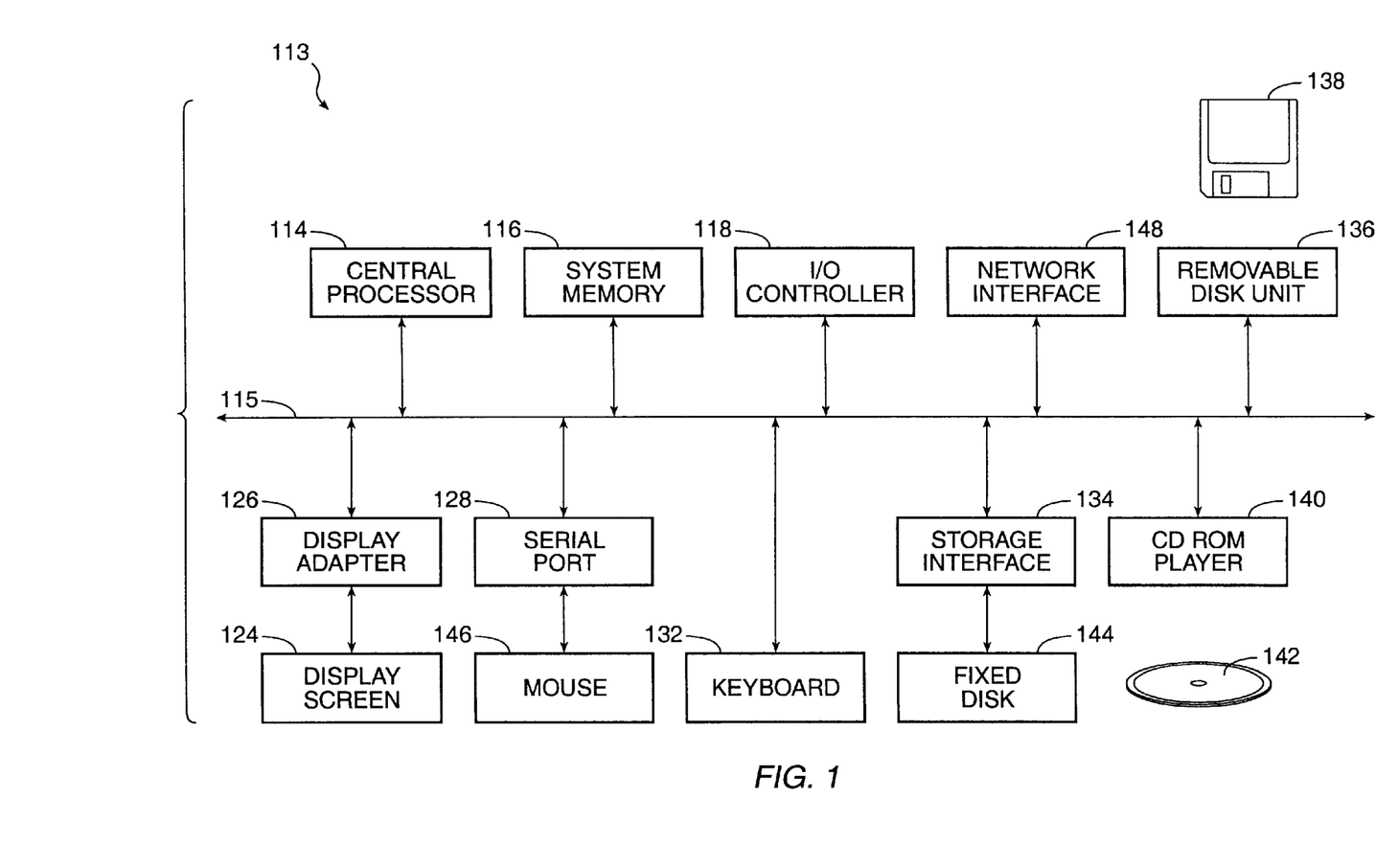
FIG. 1 illustrates a representative computer system suitable for implementing a particular embodiment according to the present invention.

FIG. 1 illustrates a representative computer system suitable for implementing a particular embodiment according to the present invention. This diagram is merely an illustration and should not limit the scope of the claims herein. One of ordinary skill in the art would recognize other variations, modifications, and alternatives. FIG. 1 shows basic subsystems of a computer system 113 suitable for use with the present invention. In FIG. 1, computer system 113 includes a bus 115 which interconnects major subsystems such as a central processor 114, a system memory 116, an input/output controller 118, an external device such as a printer (not shown), a display screen 124 via a display adapter 126, a serial port 128, a keyboard 132, a fixed disk drive 144 and a removable disk drive 136 operative to receive a removable disk 138. Many other devices may be connected such as a scanner (not shown) via I/O controller 118, a mouse 146 connected to serial port 128 or a network interface 148. Many other devices or subsystems (not shown) may be connected in a similar manner. Also, it is not necessary for all of the devices shown in FIG. 1 to be present to practice the present invention, as discussed below. The devices and subsystems may be interconnected in different ways from that shown in FIG. 1. Source code to implement the present invention may be operably disposed in system memory 116 or stored on storage media such as a fixed disk 144 or a removable disk 138.

In a presently preferable embodiment according to the present invention, a method for providing customer data analysis capabilities heretofore unknown in the prior art can be operably disposed in the system memory 116 or fixed disk 144 of system 113 of FIG. 1. Customer data analysis can include, but is not limited to, decision support analysis that relates business decisions to customer behavior. Customer data analysis applications can analyze data based on customer identity and correlate customer activities, events, transactions, and status to the customers' identity. Techniques such as decision support applications, summarizing techniques and the like can also be used without departing from the scope of the present invention.

A data model represents an organization of data in a database. Choice of a data model facilitates the use of data in certain ways and may limit the use of data in others. Different applications typically require different data models that are usually quite different from one another. Thus, database applications are typically customized to the data model used by the database. These applications can be implemented for databases having different data models even though the underlying logic of the application may be similar. A meta model is an abstract data model that describes relationships between different entities or groups of entities in a data model. Applications designed and developed in accordance with a particular meta model can be reused in other similar situations. Applications can be readily customized by exposing customizable details as meta data to application code. Thus, applications can customize a data model by following the relationships described in the meta model.

Application developers can consider tradeoffs among competing factors when creating a meta model. Some of these factors are: 1) the ability to customize the data model to fit different business application needs; 2) flexibility in designing re-usable application code; and 3) the usefulness of the application when using a particular specialized data model.

Database applications can be written to conform to a meta model and refer to the detailed data model through means such as a data dictionary, for example. These and other techniques according to the present invention enable application code to be reusable. One example of a data model/meta model combination is the star schema/multi-dimensional model combination that can be useful in data warehouse applications. In this combination, the star schema comprises a "universal data model" and the multi-dimensional model comprises a meta model.

Data warehouses can use multi-dimensional models, such as meta models, to conceptualize business operations, for example. Such meta models can simplify tasks of analyzing and understanding the performance or efficiencies of business operations. Multi-dimensional models can provide "macro" views of the business performance, for example. Such views can be highly summarized in order to show the company executives a clear "big picture" of the business. Each piece of data can be indexed by multiple business processes, aspects, and the like in order to illustrate data from different view points to the executives.

In specific embodiments, profiling can be implemented by means of data structures. The data structures can include meta data that can record how segmentation assignments and profiles are performed, so that the process can be repeated, for example. Results of a segmentation and profiling can also be stored in a data structure. This data structure can be used to generate database tables and the like.

Figure 2:
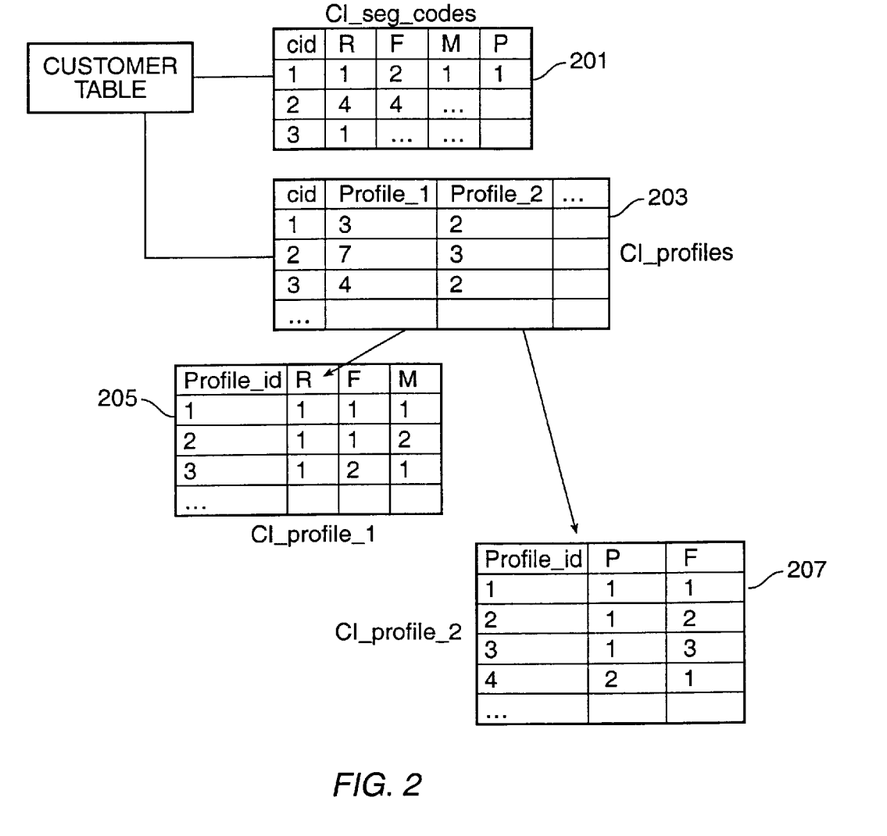
FIG. 2 illustrates in a representative embodiment according to the present invention.

FIG. 2 illustrates a representation of a data tables in a particular embodiment according to the present invention. This diagram is merely an illustration and should not limit the scope of the claims herein. One of ordinary skill in the art would recognize other variations, modifications, and alternatives. FIG. 2 illustrates example database tables, including a first table 201, containing segment code values, CI_seg_codes, and a second table 203, containing profiles, CI_profiles. Tables 201 and 203 can be created from the segmentation coding and profiling as described herein. First table 201 can be linked to a table containing customer data, such as customer data table 200, for example. Accordingly, tables 201 and 203 can serve as extensions of customer table 200. Columns in tables 201 and 203 can represent segment code values and profile identifiers for customers, and the like. For example, table 201 illustrates a customer (cid) "1", having an "R" code value of "1" and an "F" code value of "2". Similarly, table 203 illustrates that this customer has a profile identifier under "Profile_1" of "3." Further, table 203 can be linked to profile tables, such as profile table 205, CI_profile_1 in this example, and profile table 207, CI_profile_2 in this example. Accordingly, the Profile_1 identifier is linked to profile table 205, which corresponds to an (R, F, M) (1, 2, 1) for the customer whose cid is "1" in table 203.

Figure 3:
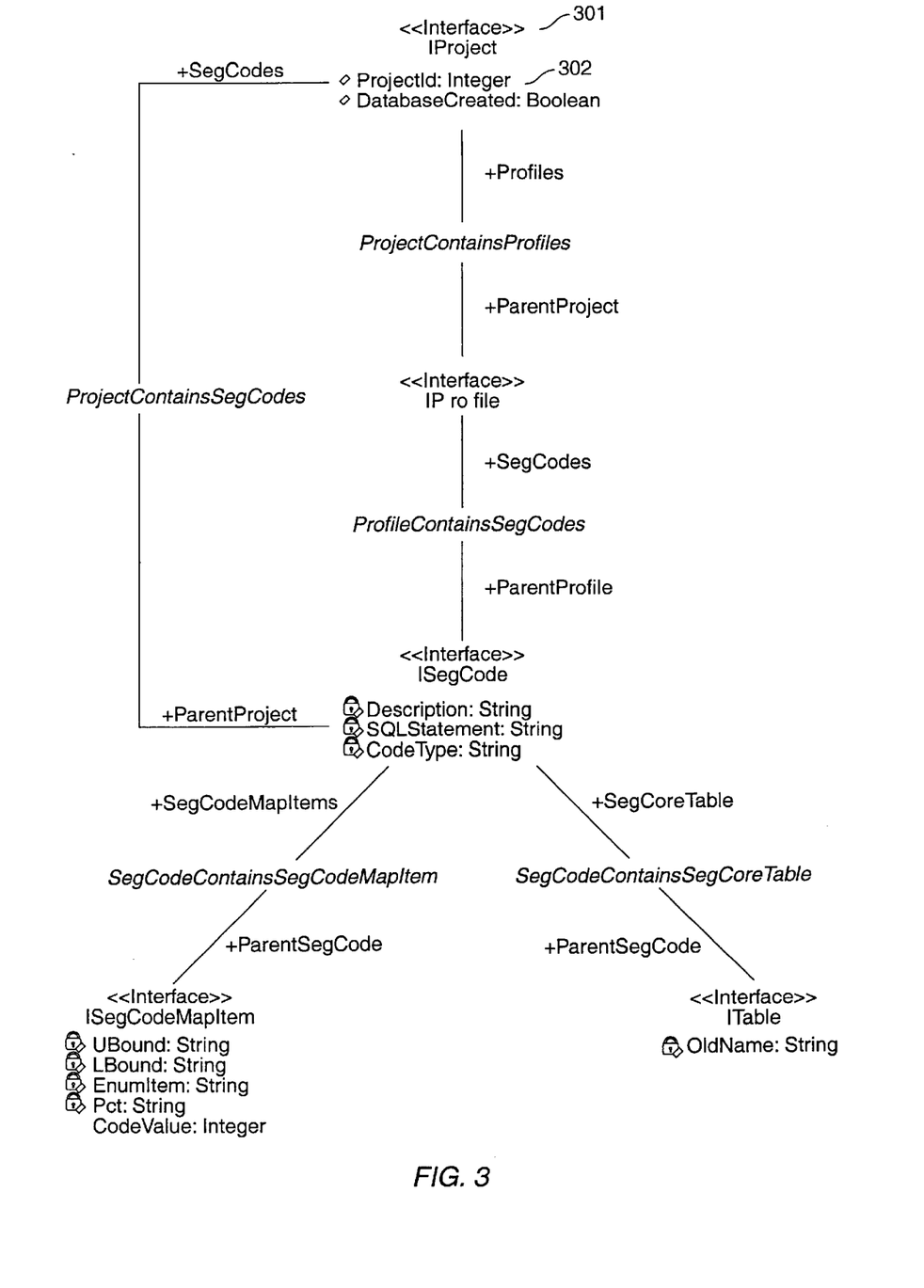
FIG. 3 illustrates in a representative embodiment according to the present invention.

FIG. 3 illustrates a representation of a data model in a particular embodiment according to the present invention. This diagram is merely an illustration and should not limit the scope of the claims herein. One of ordinary skill in the art would recognize other variations, modifications, and alternatives. FIG. 3 illustrates a repository information model 301. Data model 301 illustrates a project 302 having can contain multiple profiles, which is in turn composed of one or more segment codes. Each code is defined by an expression and segment mapping (ranges, percentile or enumeration).

Specific embodiments can provide graphical user interfaces that facilitate creating dynamic profiling data and processing the data to produce database tables. FIGS. 5A–5I illustrate various screens of a graphical user interface that can be used in a representative embodiment according to the present invention. These diagrams are merely illustrations and should not limit the scope of the claims herein. One of ordinary skill in the art would recognize other variations, modifications and alternatives.

Figure 4A:
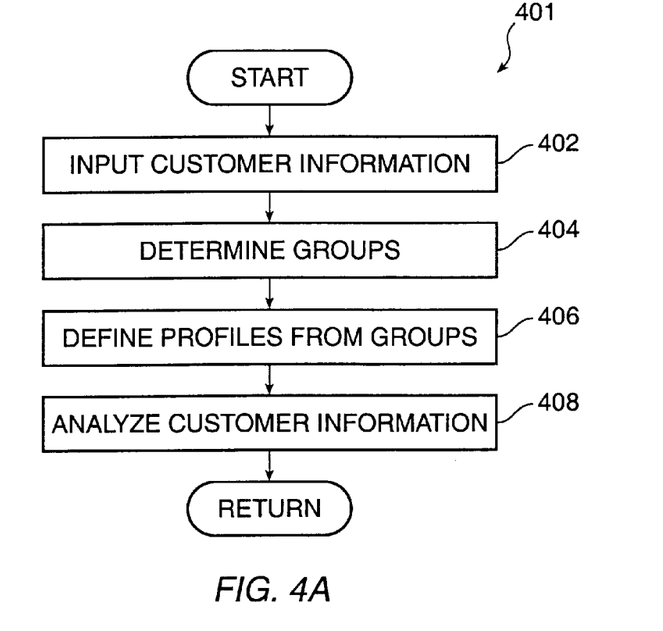
FIGS. 4A–4C illustrate representative flowcharts of simplified process steps according to an embodiment of the present invention.

FIG. 4A depicts a simplified flow diagram for the method for creating a customer profile in a particular embodiment according to the present invention. This diagram is merely an example which should not limit the scope of the claims herein. One of ordinary skill in the art would recognize many other variations, alternatives, and modifications. FIG. 4A illustrates flow diagram 401 having a step 402 of accessing customer information. The customer information can be retrieved from a database, data mart or data warehouse, for example. The customer information can be accessed from a data warehousing environment, comprising one or more legacy databases, for example, coupled with one or more servers and accessible by one or more client computers. In some embodiments, the customer information can also be accessed across a computer network or the Internet, for example. Then, a step 404 of segmenting customer information into one or more groups of customers can be performed. The customer information can comprise one or more attributes. The segmenting can be based upon a value for the attribute or attributes of interest. A step 406 of defining one or more profiles can also be part of the method. A profile can comprise one or more groups. Then, in a step 408, the customer profile can be used to analyze the customer information. Results of the analysis of step 408 can be used for a plurality of uses. The marketer can determine the efficacy of her marketing mix, for example. A product planner of a large multi-national corporation can determine whether to entire a new line of business, or divest an existing line of business.

Figure 4B:
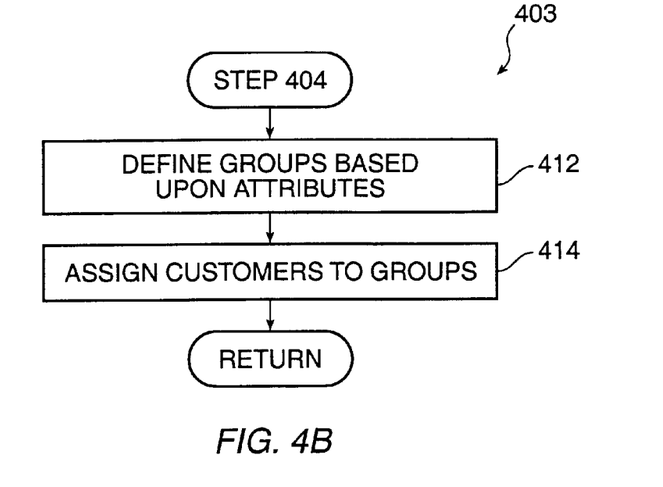

FIG. 4B depicts a simplified flow diagram of determining step 404 of FIG. 4A in a particular embodiment according to the present invention. This diagram is merely an example which should not limit the scope of the claims herein. One of ordinary skill in the art would recognize many other variations, alternatives, and modifications. FIG. 4B illustrates a flow diagram 403 having a step 412 of defining groups based upon attributes. One or more groups can be defined for the customer information. Attributes, such as age, income and the like can be used to define the groups, as described above. Once groups have been defined, then in a step 414, customers are assigned to the groups. The assignment can be performed based upon the values of the customers have for the particular attributes used to define the group. A plurality of groups can be defined for a particular set of customer data, and no particular definition is "correct." Rather, different definitions can be selected depending on the nature of the customer data and the types of analysis that are desired.

Figure 4C:
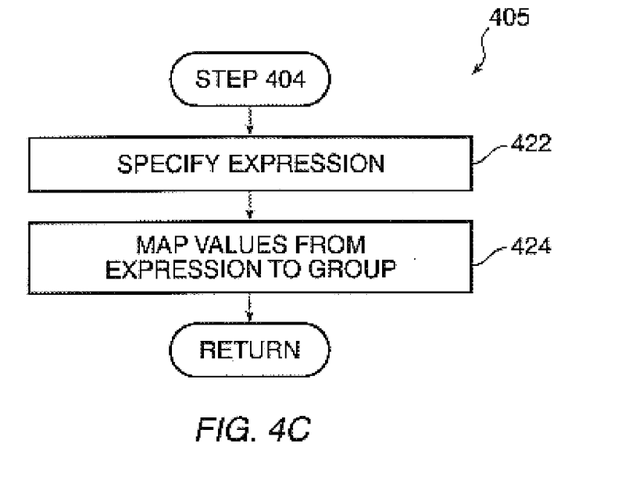

FIG. 4C depicts a simplified flow diagram of determining step 404 of FIG. 4A in another particular embodiment according to the present invention. This diagram is merely an example which should not limit the scope of the claims herein. One of ordinary skill in the art would recognize many other variations, alternatives, and modifications. FIG. 4C illustrates a flow diagram, 405 having a step 422 of specifying an expression. Expressions can evaluate to specific values that can then be used to select which group a particular customer belongs. Next, in a step 424, values from evaluating the expression(s) defined in step 422 can be mapped to specific customer groups based upon segment code values assigned to the various groups of customers.

Figure 5A:
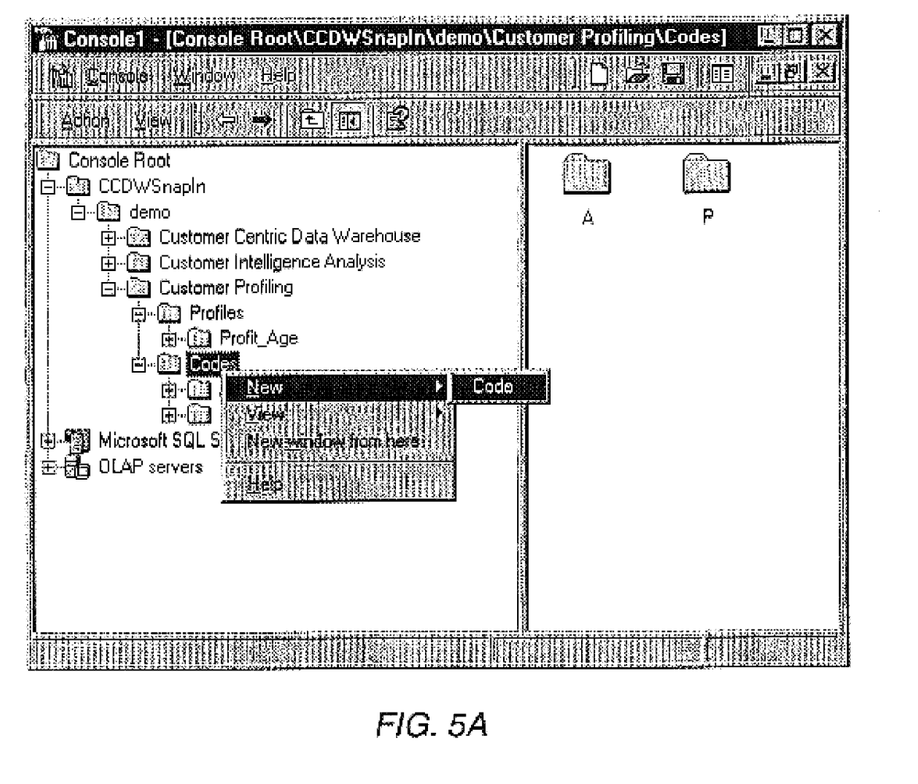
FIGS. 5A–5I illustrate example screens in a representative embodiment according to the present invention.

FIG. 5A illustrates a representative screen for creating segmentation codes in a particular embodiment according to the present invention. This diagram is merely an illustration and should not limit the scope of the claims herein. One of ordinary skill in the art would recognize other variations, modifications, and alternatives. FIG. 5A illustrates a screen 501 having a Codes folder 504 under a Customer Profiling folder 502. The user can click the codes folder and select "New" and "code" from the menus 506.

Figure 5B:
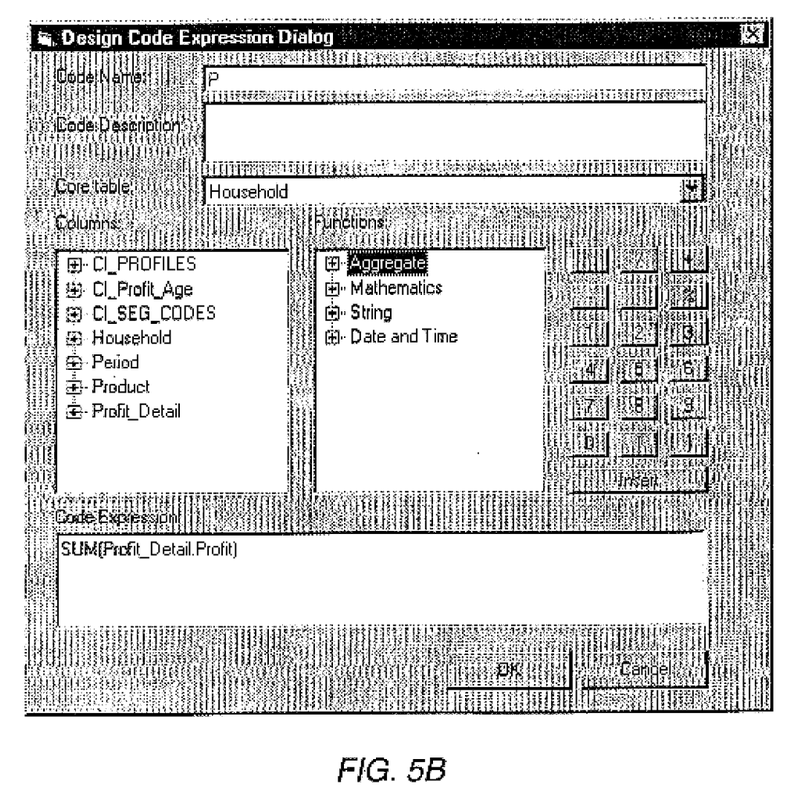

FIG. 5B illustrates a representative screen for creating segmentation codes in a particular embodiment according to the present invention. This diagram is merely an illustration and should not limit the scope of the claims herein. One of ordinary skill in the art would recognize other variations, modifications, and alternatives. FIG. 5B illustrates a screen 503 for defining an expression. Screen 503 comprises a columns pane 510 that lists the available tables and columns to choose from for building the expression. A functions pane 512 provides functions that can be used in creating expressions. The aggregation functions can provide capability to produce multiple values per profile subject (e.g. household) which can be specified by a core table combo box 514, for example. The user can define the expression and then click an OK button 516.

Figure 5C:
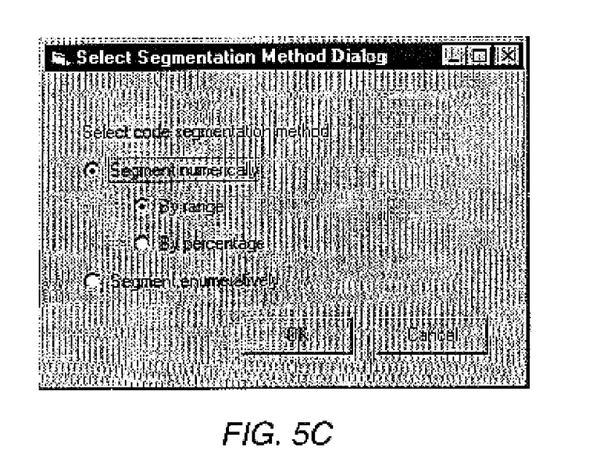

FIG. 5C illustrates a representative screen for creating segmentation codes in a particular embodiment according to the present invention. This diagram is merely an illustration and should not limit the scope of the claims herein. One of ordinary skill in the art would recognize other variations, modifications, and alternatives. FIG. 5C illustrates a screen 505 having a select segmentation method dialog box 520. Using dialog box 520, the user can choose from multiple methods to assign segmentation codes. For example, dialog box 520 comprises buttons for selecting segment numerically 522, which can be selectively performed by range using button 524 or by percentage using button 526. Further, dialog box 520 includes a button for selecting segment enumeratively 528. Select embodiments can include other types of segmentation techniques, such as ranges, Boolean expressions, arithmetic expressions, and combinations thereof without departing from the scope of the claimed invention.

Figure 5D:
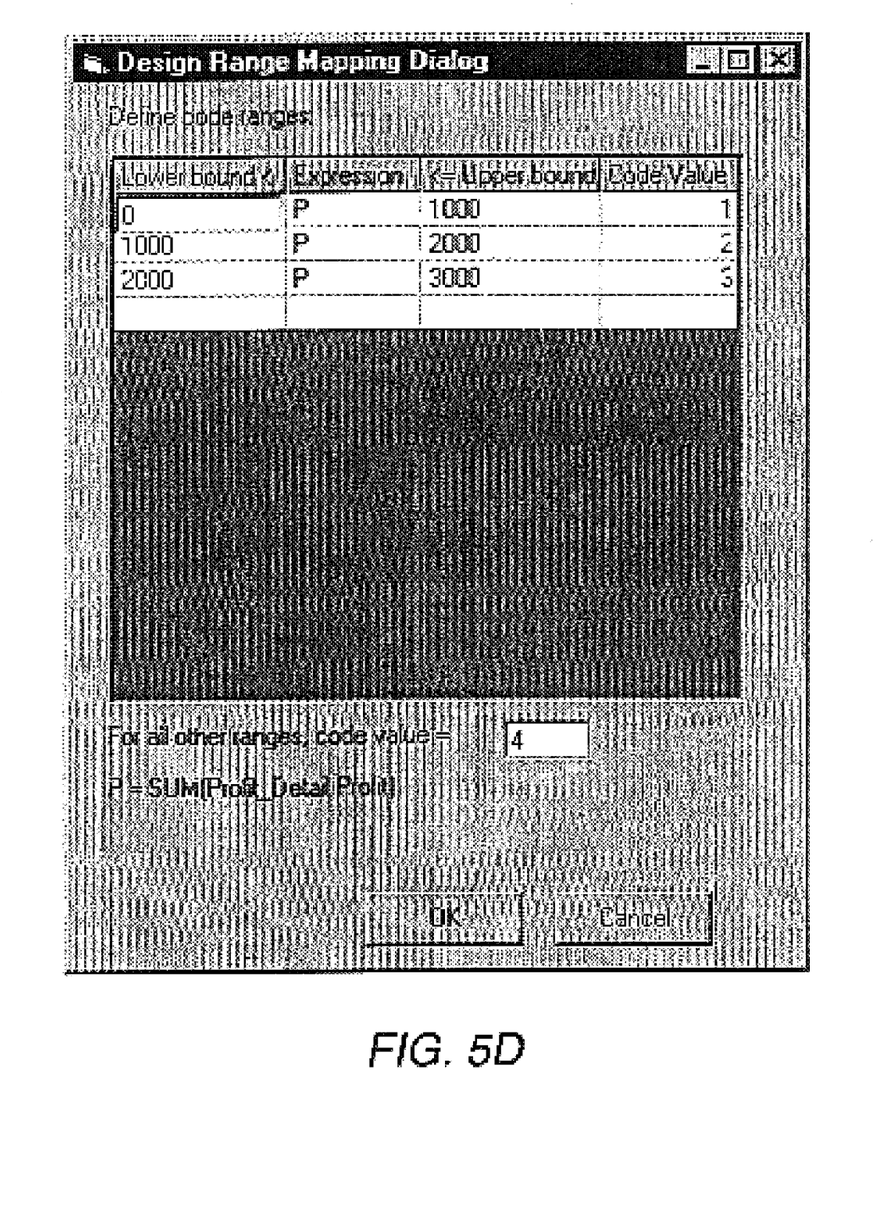

FIG. 5D illustrates a representative screen for creating segmentation codes in a particular embodiment according to the present invention. This diagram is merely an illustration and should not limit the scope of the claims herein. One of ordinary skill in the art would recognize other variations, modifications, and alternatives. FIG. 5D illustrates a screen 507 having an example range assignment dialog 530. Range assignment dialog 530 comprises a plurality of columns, including a lower bound column 532, a corresponding expression column 534, an upper bound column 536, and a corresponding code value column 538.

Figure 5E:
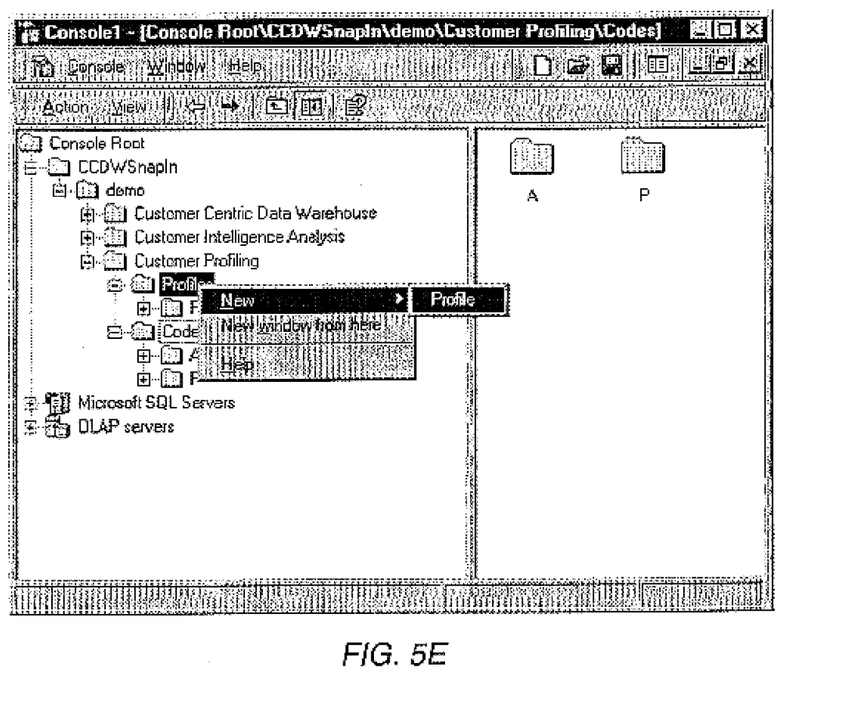

FIG. 5E illustrates a representative screen for creating profiles in a particular embodiment according to the present invention. This diagram is merely an illustration and should not limit the scope of the claims herein. One of ordinary skill in the art would recognize other variations, modifications, and alternatives. FIG. 5E illustrates a screen 509 having a profiles folder 540 under a Customer Profiling folder 542. The user can click the profiles folder and select "New" and "profile" from the menus 544.

Figure 5F:
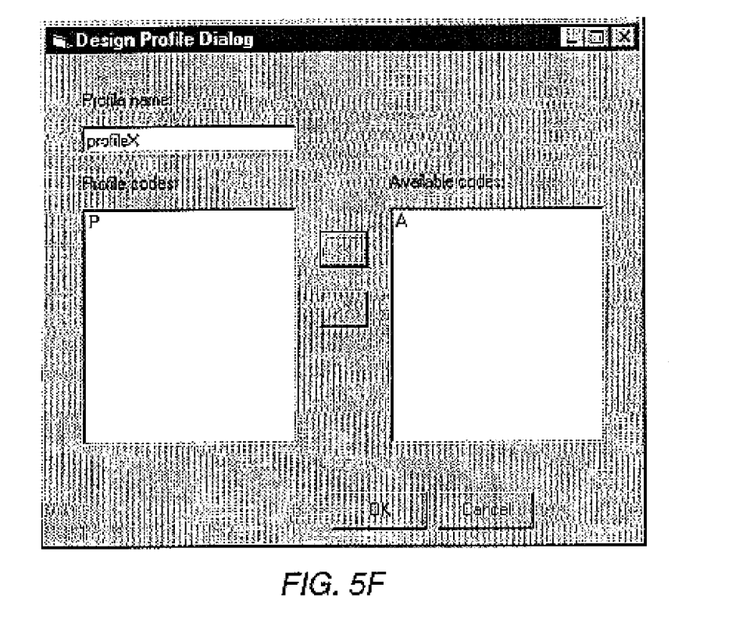

FIG. 5F illustrates a representative screen for creating profiles in a particular embodiment according to the present invention. This diagram is merely an illustration and should not limit the scope of the claims herein. One of ordinary skill in the art would recognize other variations, modifications, and alternatives. FIG. 5F illustrates a screen 511 having a design profile dialog box 550. Using dialog box 550, the user can enter a profile name into a profile name field 552. Then, the user can choose from multiple profile codes in a profile codes list 554 and assign them to an available codes list 556 using buttons 558.

Figure 5G:
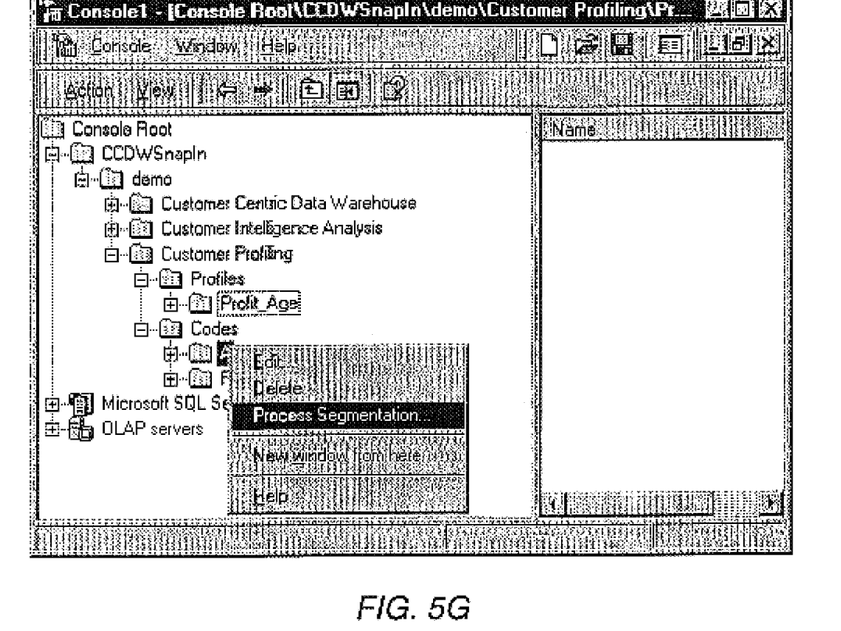

FIG. 5G illustrates a representative screen for processing a segmentation expression in a particular embodiment according to the present invention. This diagram is merely an illustration and should not limit the scope of the claims herein. One of ordinary skill in the art would recognize other variations, modifications, and alternatives. FIG. 5G illustrates a screen 513 having a Codes folder 564 under a Customer Profiling folder 562. The user can click the codes folder and select "Process Segmentation" from a menu 566.

Figure 5H:
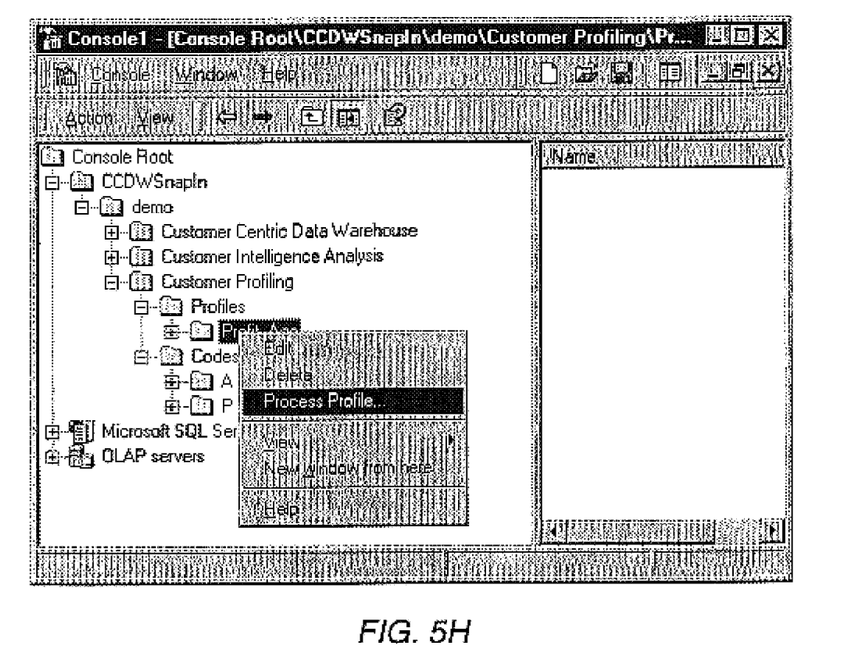

FIG. 5H illustrates a representative screen for processing a profile in a particular embodiment according to the present invention. This diagram is merely an illustration and should not limit the scope of the claims herein. One of ordinary skill in the art would recognize other variations, modifications, and alternatives. FIG. 5H illustrates a screen 515 having a profiles folder 560 under a Customer Profiling folder 562. The user can click the profiles folder and select "Process profile" from a menu 564 to "execute" the segmentation and profile plans designed previously and generate data in a data warehouse in a format according to the segmentation codes and profiles.

Figure 5I:
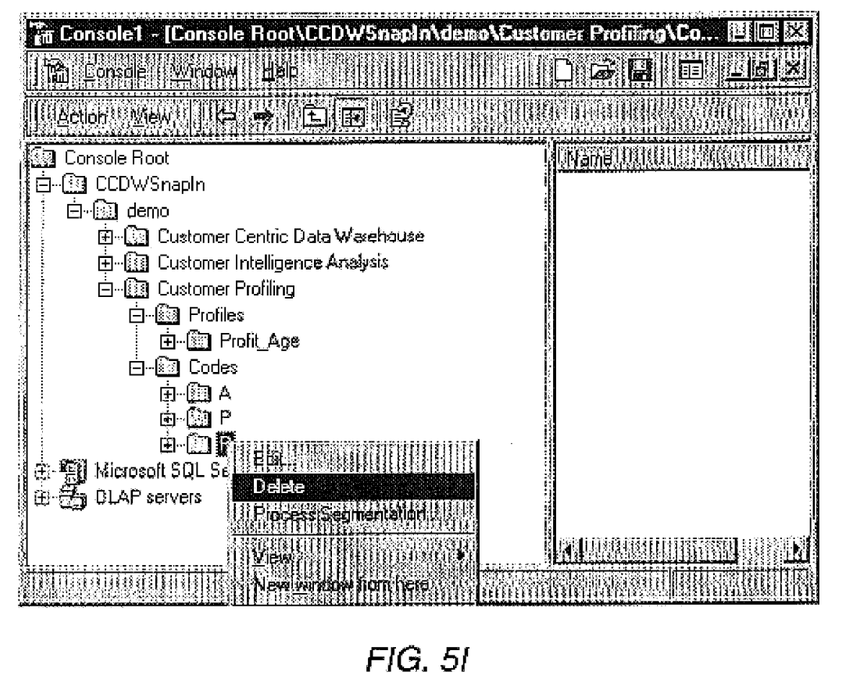

FIG. 5I illustrates a representative screen for deleting a segmentation codes in a particular embodiment according to the present invention. This diagram is merely an illustration and should not limit the scope of the claims herein. One of ordinary skill in the art would recognize other variations, modifications, and alternatives. FIG. 5I illustrates a screen 517 having a Codes folder 574 under a Customer Profiling folder 572. The user can click the codes folder and select "Delete" from a menu 576 to delete the selected codes.

CONCLUSION

Although the above has generally described the present invention according to specific systems, the present invention has a much broader range of applicability. In particular, the present invention is not limited to a particular kind of data schema, but can be applied to any data model where an improved or optimized analysis is desired for use with customer centered data warehousing systems and applications. Thus, in some embodiments, the techniques of the present invention could provide access to many different legacy business, governmental and educational databases of all kinds. Of course, one of ordinary skill in the art would recognize other variations, modifications, and alternatives.

What is claimed is:

1. A method for creating a customer profile from customer information stored in at least one database, the customer information comprising at least one attribute, the method comprising:
   receiving as input a first schema database comprising customer information;
   receiving a definition of a meta model;
   segmenting said customer information into at least one of a plurality of groups based upon the meta model, the segmenting further comprising:
      receiving a first segmentation code value;
      displaying a list of tables and columns from the first schema database;
      displaying a list of available functions;
      receiving selections of tables, columns and functions defining a dynamic expression; and
      associating the dynamic expression with the first segmentation code value;
   defining at least one of a plurality of profiles; wherein each profile comprises at least one group; and wherein each profile includes at least one dynamic expression; and
   executing at least one profile by successively evaluating the dynamic expression, thereby enabling dynamic assignment of customers to groups in organizing the customer information into a second schema database.

2. The method of claim 1 wherein segmenting further comprises:

defining each of the at least one of a plurality of groups; wherein customers are assignable into least one of a plurality of groups based upon a value of an attribute corresponding to the customer and the dynamic expression; and wherein each customer is assigned to at most one group.

3. The method of claim 1 wherein segmenting further comprises:

specifying at least one of a plurality of expressions; each evaluating to a value.

4. The method of claim 3 wherein segmenting further comprises:

mapping the values produced by the at least one of a plurality of expressions to at least one of a plurality of segmentation code values.

5. The method of claim 4 wherein mapping further comprises:

assigning numeric values to particular ones of plurality of segmentation code values.

6. The method of claim 4 wherein mapping further comprises:

assigning enumerative values to particular ones of plurality of segmentation code values.

7. The method of claim 4 wherein mapping further comprises:

mapping a range of expression values to at least one segmentation code value.

8. The method claim 1 wherein the expression further comprises a plurality of attributes, the attributes combinable based upon at least one of a plurality of functions.

9. The method of claim wherein 8 the at least one of a plurality of functions includes at least one of arithmetic operators and logical operators.

10. The method of claim 1 wherein said at least one attribute includes a least one of age and income.

11. The method of claim 1, wherein defining a group includes selecting a method for assigning values to at least one attribute associated with the group; and assigning new values for at least one of the associated attributes such that the segmenting of the customer information into the group is based upon the new value.

12. The method of claim 11, wherein the method for assigning values to at least one attribute associated with the group is selected from at least one of a numerical assignment method, a range assignment method, a percentage assignment method, and an enumerative assignment method.

13. The method of claim 12, wherein upon the selection of the range assignment method, a display is presented to the user that permits the user to input a lower bound value and an upper bound value.

* * * * *